United States Patent
Mizuno

(10) Patent No.: US 7,061,673 B2
(45) Date of Patent: Jun. 13, 2006

(54) CONFOCAL PROBE

(75) Inventor: Rogerio Jun Mizuno, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 98 days.

(21) Appl. No.: 10/784,220

(22) Filed: Feb. 24, 2004

(65) Prior Publication Data

US 2004/0165184 A1    Aug. 26, 2004

(30) Foreign Application Priority Data

Feb. 24, 2003    (JP)    ............................. 2003-046628

(51) Int. Cl.
*G02B 21/06* (2006.01)
*G01J 3/28* (2006.01)

(52) U.S. Cl. ..................... 359/385; 356/326; 359/368

(58) Field of Classification Search ............... 356/326, 356/328, 331, 332; 359/368, 385
See application file for complete search history.

(56) References Cited

U.S. PATENT DOCUMENTS

| 5,323,009 A | 6/1994 | Harris et al. |
| 6,341,036 B1 | 1/2002 | Tearney et al. |
| 6,831,781 B1 * | 12/2004 | Tearney et al. ............. 359/385 |

FOREIGN PATENT DOCUMENTS

| JP | 2002-505434 | 2/2002 |
| WO | 99/44089 | 9/1999 |

* cited by examiner

*Primary Examiner*—F. L. Evans
(74) *Attorney, Agent, or Firm*—Greenblum & Bernstein, P.L.C.

(57) ABSTRACT

A confocal probe is provided with an optical fiber introducing light having wavelengths within a predetermined wavelength range in the confocal probe, a collimating lens that collimates light emerged from an end surface of the optical fiber, a dispersing prism that receives the light collimated by the collimating lens and disperses the received light in a predetermined direction, light emerged from the dispersing prism and having the same wavelength being kept collimated, and a light converging optical system that converges the light emerged from the dispersing prism on a target (i.e., region of interest).

11 Claims, 4 Drawing Sheets

CONFOCAL PROBE

BACKGROUND OF THE INVENTION

The present invention relates to a confocal probe for obtaining a high-magnification tomogram of in vivo tissues in a human cavity.

Conventionally, when in vivo tissues are investigated at a thorough examination of a body, tissues at a targeted portion is collected using a cutting forceps or the like, and the collected tissues are investigated extracorporeally. Therefore, it takes relatively long time to obtain a diagnosis result, and an appropriate treatment of a patient cannot be taken immediately.

Recently, in order to accelerate the diagnosis procedure, confocal probe devices have been widely used. The confocal probe enables an operator to perform a non-invasive observation of a tomogram of in vivo tissues. The confocal probe device typically includes a micro-machined fine probe which is employed in confocal microscopes. The confocal probe is typically provided with a scanning mirror provided inside the probe to scan a laser beam on the target (i.e., human tissues) to capture a two-dimensional or three-dimensional image of the target.

As an example of such a confocal probe, a confocal microscope is disclosed in PCT Publication W099/44089, teachings of which are incorporated herein by reference. In the confocal microscope illustrated in the above publication, a region of interest is illuminated with a confocal spectrum extending in one direction, and the spectrum is scanned along one or two additional dimension. Then, a reflected confocal spectrum is detected to obtain a two-dimensional or three-dimensional image of the region of interest. As shown in FIG. 6, which schematically illustrates the conventional probe disclosed in the publication, a polychromatic beam emerged from an optical fiber is incident on a diffraction grating. The incident beam is dispersed by the grating, and focused by an objective lens onto the region of interest.

Since the confocal microscope described above employs the diffraction grating, relatively large amount of light may be lost when the multi-spectrum light rays are diffracted. Further, the dispersed light may not have even intensity distribution in the dispersed direction. Therefore, an image obtained by such a confocal microscope may be deteriorated due to uneven illumination of the region of interest.

The confocal microscope should be configured such that the light reflected by the region of interest should proceed along the optical path same as that used for illuminating the region of interest. In this regard, the light rays should be incident on the region of interest substantially perpendicularly (i.e., at the incident angle of 0°). Thus, according to the conventional confocal microscope as shown in FIG. 6, it is impossible to arrange the optical path of the light emerged from the objective lens and the optical path of the light incident on the diffraction grating to be parallel with each other. Therefore, the confocal microscope as a whole may be relatively large, or the confocal microscope may have a portion having a relatively large diameter, which prevents installation of the confocal microscope to a main body of a device. Further, a large size or diameter of the confocal microscope prevents a smooth operation thereof by an operator and/or causes pain to a patient.

SUMMARY OF THE INVENTION

The confocal probe according to the invention is advantageous in that loss of light is prevented, and light beam having substantially even intensity distribution is incident on a region of interest. Further, the invention is advantageous in that the size or diameter of the confocal probe can be decreased.

According to an aspect of the invention, there is provided a confocal probe, which includes an optical fiber introducing light having wavelengths within a predetermined wavelength range in the confocal probe, a collimating lens that collimates light emerged from an end surface of the optical fiber, a dispersing prism that receives the light collimated by the collimating lens and disperses the received light in a predetermined direction, light emerged from the dispersing prism and having the same wavelength being kept collimated, and a light converging optical system that converges the light emerged from the dispersing prism on a target (i.e., region of interest).

With this configuration, by detecting the spectrum of the light returned from the target, the image can be obtained.

Optionally, an optical axis of the collimating lens, an optical axis of the light converging optical system and an optical path of a chief ray of the light emerged from the end surface of the optical fiber may be substantially parallel with each other, the optical path of the chief ray of the light emerged from the end surface of the optical fiber being shifted with the optical axis of the collimating lens by a predetermined amount.

Further optionally, the collimating lens may be arranged such that a distance from the collimating lens to the end surface of the optical fiber and a distance from the collimating lens to a light incident surface of the dispersing prism are substantially the same as a focal length of the collimating lens.

In a particular case, a shifting amount $\Delta g$ between the optical path of the chief ray of the light emerged from the optical fiber and the optical axis of the collimating lens may be expressed by a following equation:

$$\Delta g = f_{CL} \cdot \tan[\theta_{in} + \theta_{out}(\lambda_0) - \theta_\alpha],$$

where, $f_{CL}$ is a focal length of the collimating lens, $\theta_{in}$ is an incident angle of the light emerged from the collimating lens and incident on the dispersing prism, $\lambda o$ is a wavelength of a reference dispersed light passing on the optical axis of the converging optical system, $\theta_{out}(\lambda o)$ is an emerging angle of the reference dispersed light emerged from the dispersing prism, and $\theta_\alpha$ is a vertex angle of the dispersing prism.

Further optionally, the light converging optical system may be arranged such that a distance from the light converging optical system to a position where each dispersed beam is emerged from the dispersing prism is substantially the same as the focal length of the light converging optical system.

In one embodiment, the dispersing prism is a triangular prism. In another embodiment, the dispersing prism is a wedge prism.

Still optionally, the confocal probe may include a driving mechanism that drives the light converging optical system in a direction perpendicular to the optical axis of the converging optical system and the predetermined direction.

Furthermore, the confocal probe may include a pinhole that shields light returned by the region of interest at a position other than the target side focal plane of the converging optical system. The pinhole may be the end surface of the optical fiber on which the light reflected by the target is incident.

According to another aspect of the invention, there is provided a confocal probe, which includes an optical fiber introducing light having wavelengths within a predetermined wavelength range in the confocal probe, a collimating lens that collimates light emerged from an end surface of the optical fiber, a dispersing optical system that receives the light collimated by the collimating lens and disperses the received light in a predetermined direction, light emerged from the dispersing optical system and having the same wavelength being kept collimated, and a light converging optical system that converges the light emerged from the dispersing optical system on a region of interest. An optical axis of the collimating lens, an optical axis of the light converging optical system and an optical path of a chief ray of the light emerged from the end surface of the optical fiber may be substantially parallel with each other, the optical path of the chief ray of the light emerged from the end surface of the optical fiber being shifted with respect to the optical axis of the collimating lens by a predetermined amount.

According to a further aspect of the invention, there is provided a confocal microscope, which includes a multi-spectrum light source that emits light having wavelengths within a predetermined wavelength range, a confocal probe which includes an optical fiber that introduces the light emitted by the multi-spectrum light source in the confocal probe, a collimating lens that collimates light transmitted by and emerged from an end surface of the optical fiber, a dispersing prism that receives the light collimated by the collimating lens and disperses the received light in a predetermined direction, light emerged from the dispersing prism and having the same wavelength being kept collimated, and a light converging optical system that converges the light emerged from the dispersing prism on a region of interest, a measuring device that detects spectrum of the light returned from the target, and an image generating system that generates an image of the target based on an output of the measuring device.

BRIEF DESCRIPTION OF THE ACCOMPANYING DRAWINGS

FIG. 1 shows a block diagram illustrating a configuration of a confocal microscope provided with a confocal probe according to an embodiment of the invention;

FIG. 2 schematically shows a structure of a confocal probe according to the embodiment of the invention;

Figure 5:
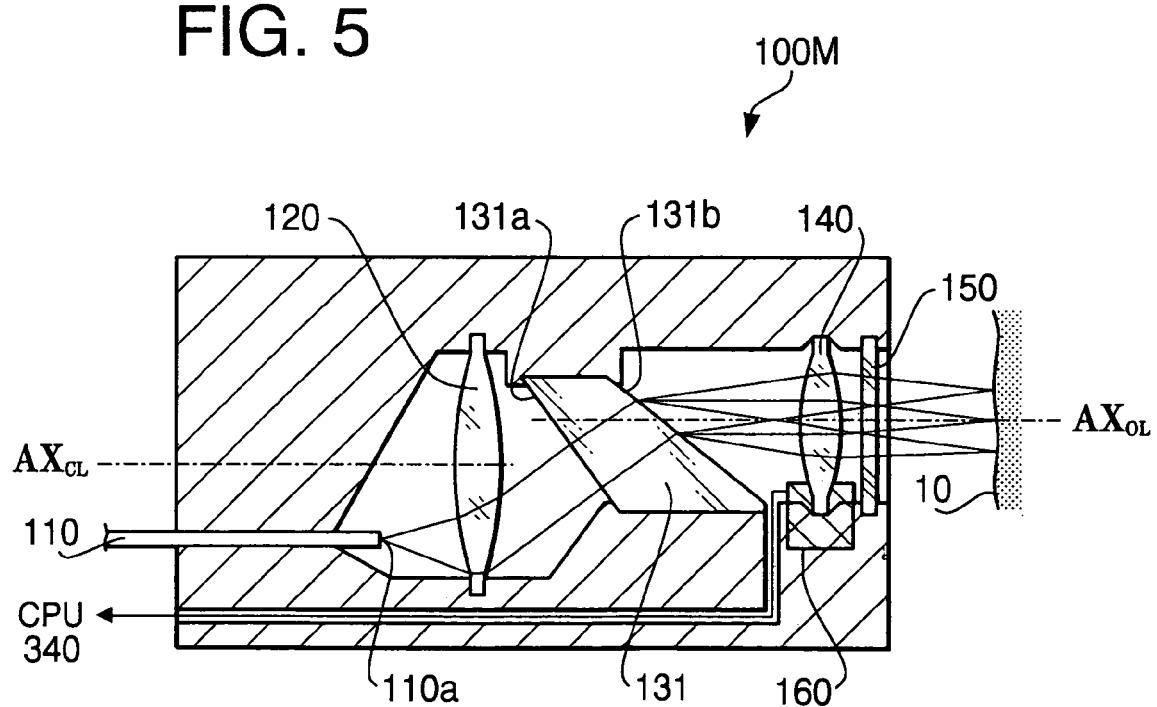
Figure 6:
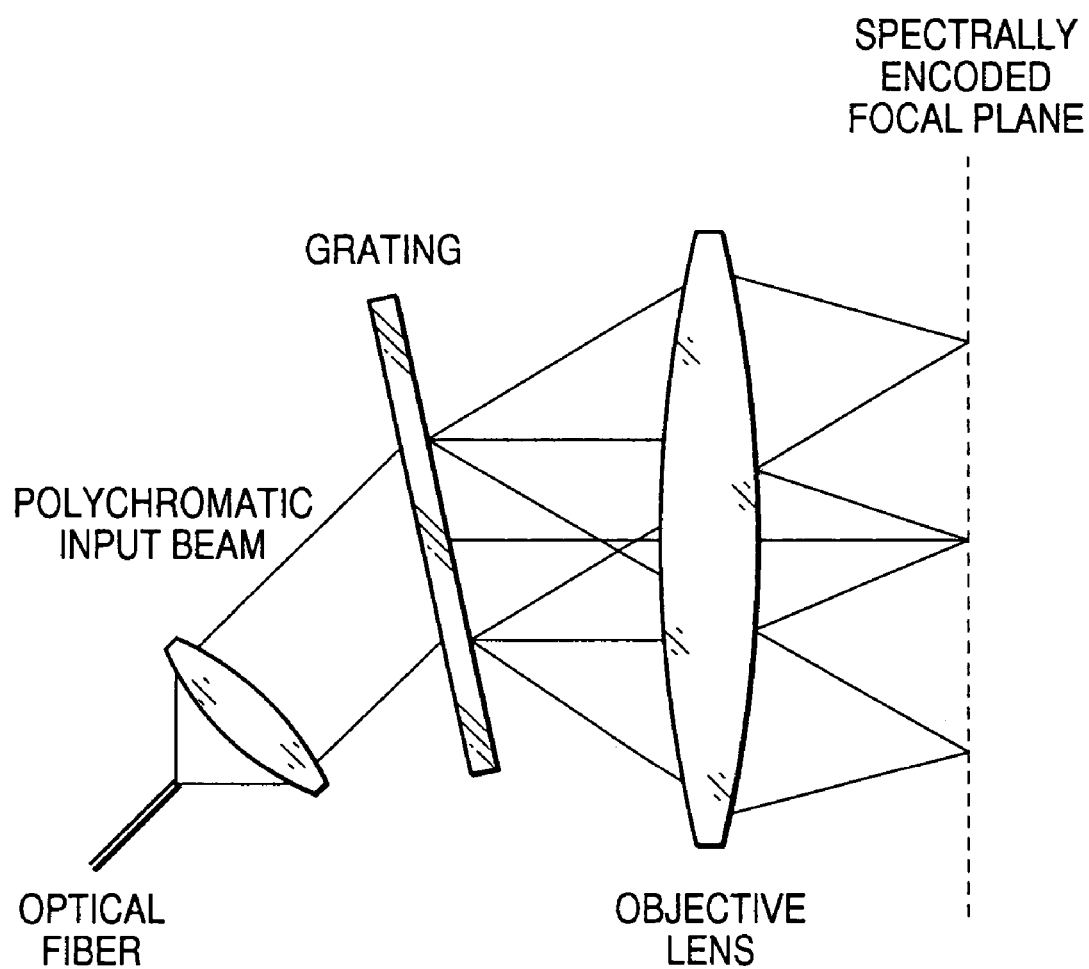

FIG. 5 schematically shows a structure of a confocal probe according to a modified embodiment of the invention; and FIG. 6 shows an arrangement of optical elements of a conventional confocal microscope.

DETAILED DESCRIPTION OF THE EMBODIMENTS

Hereinafter, referring to the accompanying drawings, confocal probes according to embodiments of the invention will be described.

Figure 1:
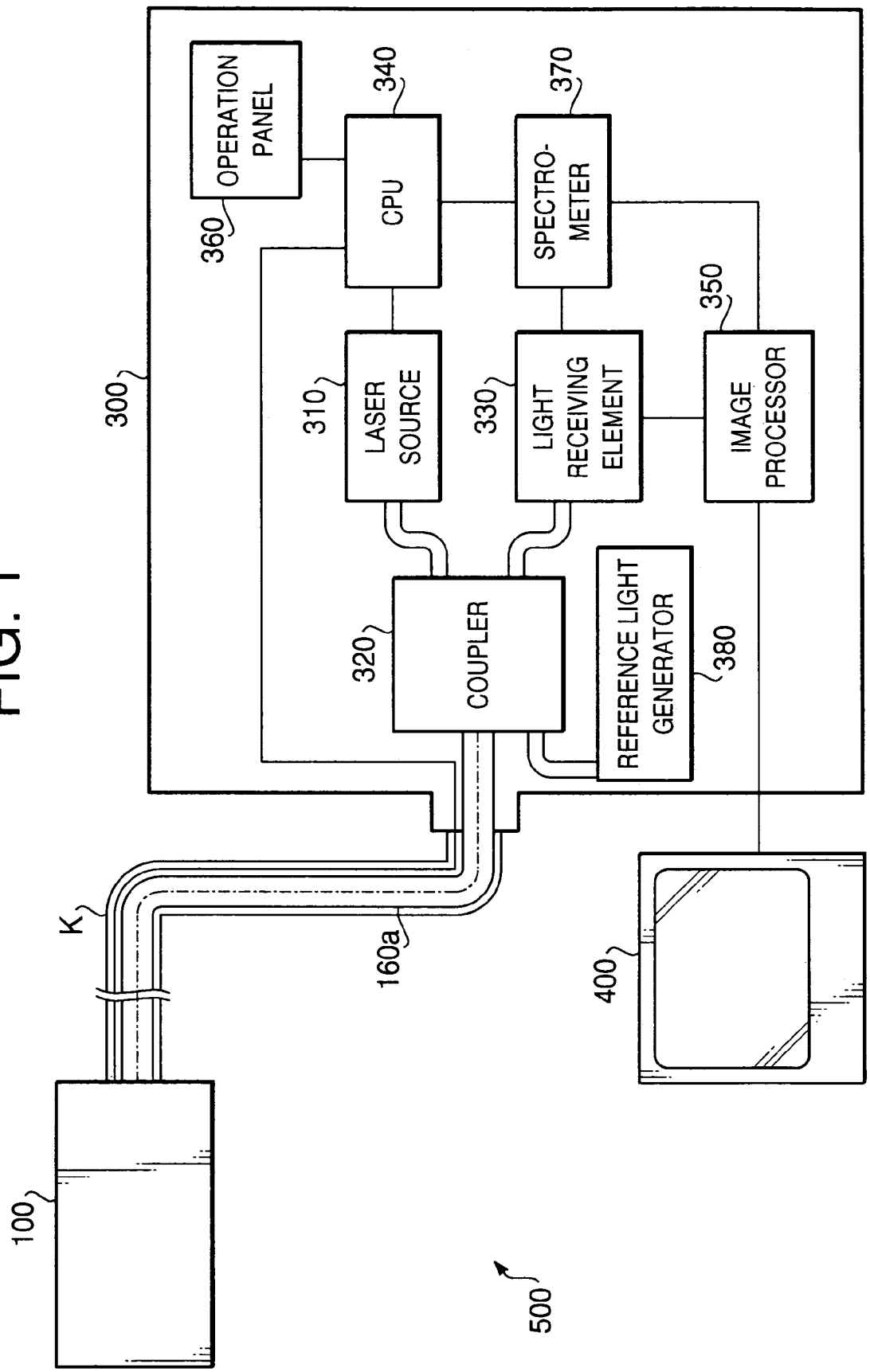

FIG. 1 is a block diagram of a confocal microscope 500 employing a confocal probe 100 according an embodiment of the invention.

The confocal microscope 500 includes, as shown in FIG. 1, the confocal probe 100, a processor 300 and a monitor 400. The confocal probe 100 is electrically and optically connected to the processor 300 through a cable K.

The processor 300 includes a laser source 310, a coupler 320, a light receiving element 330, a CPU (Central Processing Unit) 340, an image processing circuit 350, an operation panel 360, a spectrometer 370 and a reference light generator 380.

The laser source 310 is a multi-spectral light source, which emits a multi-spectral light beam having wavelengths within a predetermined wavelength range. The multi-spectral laser beam emitted by the laser source 310 is directed to the confocal probe 100 and to the reference light generator 380, through the coupler 320. The reference light generator 380 is provided with a modulator and mirror (not shown), and converts the received light into reference light.

The light reflected by a target (i.e., a region of interest) and transmitted from the confocal probe 100, and the reference light generated by the reference light generator 380 are received by the light receiving element 330. The spectrometer 370 measures the spectrum of the light (i.e., a heterodyne detection is performed), and transmits the measurement results to the image processing circuit 350 as an image signal. As will be described, the spectrum represents the image of the target in a predetermined direction. The image processing circuit 350 applies predetermined image processing procedures to the image signal transmitted from the spectrometer 370 to generate various video signals such as a composite video signal, RGB signal, S-video signal, and the like. When one of such video signals is transmitted to the monitor 400, an image of the target portion is displayed on a screen of the monitor 400.

The operator operates the operation panel 360 of the processor 300 to input various settings related to the image. The information input through the operation panel 360 by the operator is transmitted to the CPU 340. The CPU 340 drives the confocal probe and/or the processor 300 in accordance with the input information.

Figure 2:
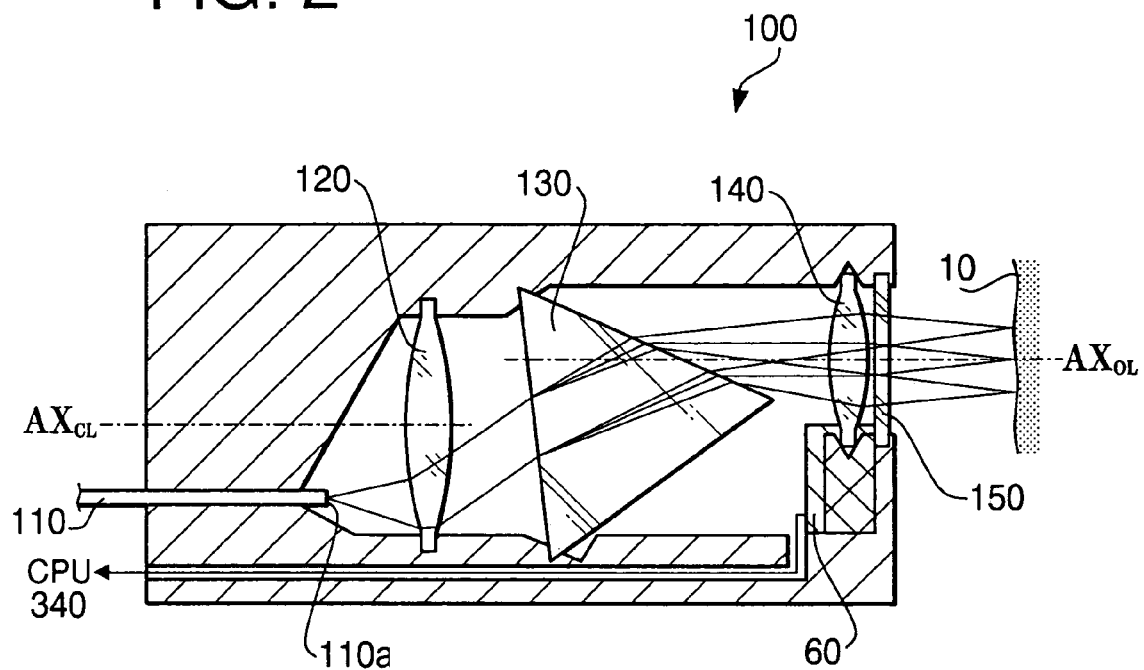

FIG. 2 schematically shows a structure of the confocal probe 100 according to the embodiment. As shown in FIG. 2, the confocal probe 100 includes, from the laser source 310 side (the left-hand side in FIG. 2), an optical fiber 110, a collimating lens 120, a triangular prism 130, an objective lens 140 and a window plate 150. The objective lens 140 is supported shiftablly by a lens shifting mechanism 160. The lens shifting mechanism 160 is capable of moving the objective lens 140 in a direction perpendicular to a plane of FIG. 2.

Figure 3:
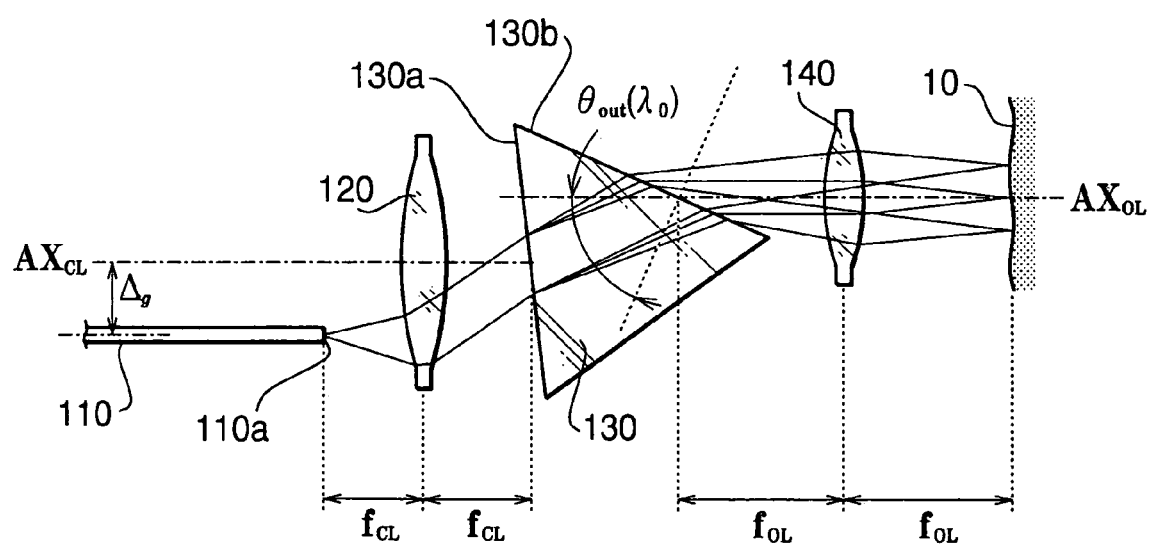
FIG. 3 shows arrangement of optical elements of a confocal probe shown in FIG. 2.
Figure 4:
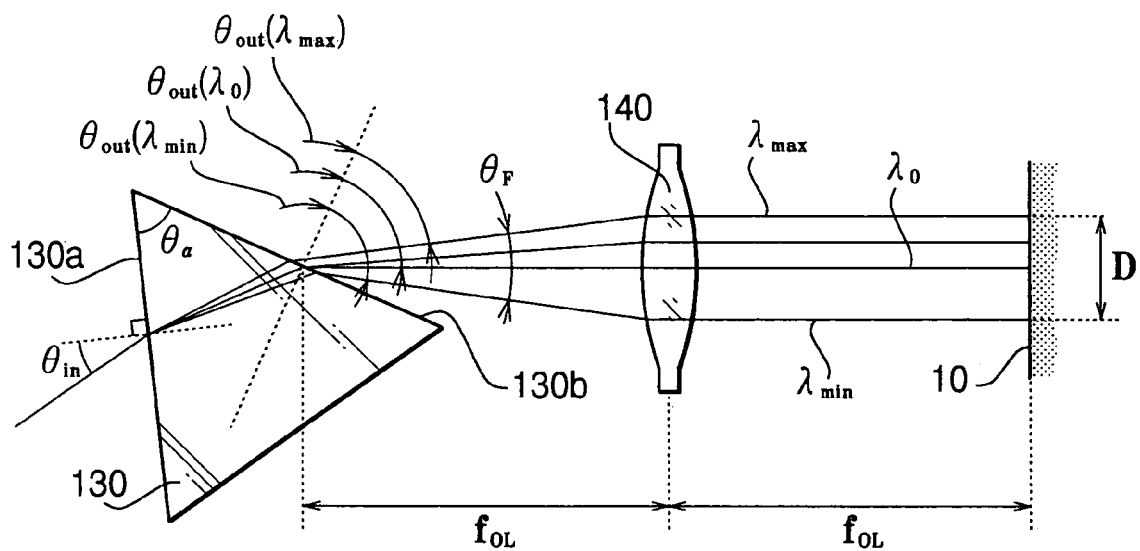
FIG. 4 is an enlarged view showing a triangular prism and an objective lens of the confocal probe shown in FIG. 2.

FIG. 3 shows an arrangement of the optical elements of the confocal probe 100 shown in FIG. 2. FIG. 4 is an enlarged view of the triangular prism 130 and the objective lens 140. In FIG. 4, for an explanatory purpose, only the chief rays of beams proceeding inside the confocal probe 100 are illustrated.

The light beam emitted by the laser source 310 and directed to the confocal probe 100 through the optical fiber 110 emerges from an end surface 110a of the optical fiber 110, and is incident on the collimating lens 120. The optical fiber 110 and the collimating lens 120 are arranged such that an optical path of the chief ray of the beam emitted from the end surface 110a is substantially parallel with an optical axis $AX_{CL}$ of the collimating lens 120. Further, the optical fiber 110 is arranged such that a distance between the end surface 110a thereof and the collimating lens 120 equals to a focal length $f_{CL}$ of the collimating lens 120. With this positional relationship, the light emitted from the end surface 110a and incident on the collimating lens 120 emerges from the collimating lens 120 as parallel light.

The parallel light emerged from the collimating lens 120 is incident on the triangular prism 130. The triangular prism 130 has a light incident surface 130a on which the light emerged from the collimating lens 120 is incident, and a light emerging surface 130b from which the light transmitted from the laser source 310 emerges.

The triangular prism 130 is arranged such that a distance between a point on the light incident surface 130a where the chief ray of the parallel light from the collimating lens 120 impinges and the collimating lens 120 is equal to the focal length $f_{CL}$ of the collimating lens 120. Further, the triangular prism 130 is inclined with respect to the collimating lens 120 such that the light rays from the collimating lens 120 are incident on the light incident surface 130a at a predetermined incident angle $\theta_{in}$ (see FIG. 4).

The triangular prism 130 disperses the incident beam depending on the wavelengths. As shown in FIG. 4, when an vertex angle (the angle formed by the light incident surface 130a and the light emerging surface 130b) is represented by $\theta_\alpha$ and a refractive index of the triangular prism 130 with respect to the light having a wavelength of $\lambda$ is represented by $n(\lambda)$, an angle of emergence $\theta_{out}(\lambda)$ of the light that is incident on the light incident surface 130a at an angle of incidence $\theta_{in}$ is given by equation (1) below.

$$\theta_{out}(\lambda) = \arcsin[\sqrt{n^2(\lambda) - \sin^2\theta_{in}} \cdot \sin\theta_\alpha - \sin\theta_{in} \cdot \cos\theta_{in}] \quad (1)$$

It is known from equation (1) that the angle of emergence $\theta_{out}(\lambda)$ depends on the wavelength of the beam.

The objective lens 140 is arranged such that the optical axis $AX_{OL}$ thereof is parallel with the chief ray of the beam emerged from the end surface 110a of the optical fiber 110 or the optical axis $AX_{CL}$ of the collimating lens 120. With this configuration, the confocal probe 100 can be made small and the diameter thereof can be decreased.

Further, according to the embodiment, the objective lens 140 is arranged such that a reference ray, which has a central wavelength within the wavelength range of the light beam, proceeds along the optical axis $AX_{OL}$ of the objective lens 140. When the wavelength of the reference ray is represented by $\lambda o$, the angle $\theta_{out}(\lambda o)$ of emergence of the reference ray is expressed by equation (2).

$$\theta_{out}(\lambda_0) = \frac{\theta_{out}(\lambda_{min}) + \theta_{out}(\lambda_{max})}{2} \quad (2)$$

where, $\theta_{out}(\lambda_{min})$ represents the angle of emergence of the beam having the shortest wavelength $\lambda_{min}$ within the spectrum of the beam incident on the triangular prism 130, and $\theta_{out}(\lambda_{max})$ represents the angle of emergence of the beam having the longest wavelength $\lambda_{max}$ within the spectrum of the beam incident on the triangular prism 130. In other words, the rays of the dispersed beam are distributed within an angular range between the angle $\theta_{out}(\lambda_{min})$ of emergence and the angle $\theta_{out}(\lambda_{max})$ of emergence, and emerges from the triangular prism 130. The dispersed beam emerging from the triangular prism 130 is directed to the objective lens 140.

It should be noted that the objective lens 140 is arranged such that a distance between a point where the optical axis $AX_{OL}$ intersects the light emerging surface 130b of the triangular prism 130 and the objective lens 140 is equal to the focal length $f_{OL}$ of the objective lens 140. Thus, each of the rays passed through the objective lens 140 is incident on the target (i.e., the in vivo tissues) 10 substantially normally.

The rays of the dispersed beam emerged from the triangular prism 130 are converged by the objective lens 140 on the target (i.e., in vivo tissues) 10. As described above, the rays of the dispersed beam emerged from the light emerging surface 130b at different angles of emergence are incident on various positions of the target 10. With respect to light having a certain wavelength, the light is converged on the target 10 to form a beam spot thereon. Since the light incident on the triangular prism 130 distributes within a predetermined wavelength range, a linear area of the target 10 is illuminated as if a beam spot scans within the linear area. Specifically, the linear area where the rays of the dispersed beam strikes the target 10 extends along an X direction which coincides with an intersection line where a plane perpendicular to the light emerging surface 130b and including the optical axis $AX_{OL}$ of the objective lens 140 and the target 10 intersect.

A distance $d(\lambda)$, in the X direction, between a position of a beam spot formed by a dispersed beam whose wavelength is $\lambda$ and a reference position which is defined as a position of a beam spot formed by the reference beam traveling along the optical axis $AX_{OL}$ of the objective lens 140 is given by equation (3) below.

$$d(\lambda) = f_{OL} \cdot \tan[\theta_{out}(\lambda_0) - \theta_{out}(\lambda)] \quad (3)$$

Further, a length D of an area on the target 10, in the X direction, illuminated by the plurality of beam spots is given by equation (4).

$$D = 2f_{OL} \cdot \tan\left(\frac{\theta_F}{2}\right) \quad (4)$$

where, $\theta_F$ represents an angular range within which the dispersed light emerges from the light emerging surface 130b. The angle $\theta_F$ is given by equation (5).

$$\theta_F = \theta_{out}(\lambda_{min}) - \theta_{out}(\lambda_{max}) \quad (5)$$

Using equation (5), equation (4) can be modified to equation (6) below.

$$D = 2f_{OL} \cdot \tan\left[\frac{\theta_{out}(\lambda_{min}) - \theta_{out}(\lambda_{max})}{2}\right] \quad (6)$$

When the dispersed light is incident on the target 10, the lens shifting mechanism 160 moves the objective lens 140, under control of the CPU 340 of the processor 300, in a Y direction which is perpendicular to the optical axis $AX_{OL}$ of the objective lens and the X direction (i.e., a direction perpendicular to a plane of FIG. 2). With this movement, the illuminated area on the target 10 extending in the X direction moves in the Y direction, thereby two-dimensional area (extending in X and Y directions) of the target 10 are scanned.

The dispersed light is converged on the target 10, and the light returned from the target 10 is incident on the objective lens 140, proceeds along the same path as described above in an opposite direction, and then enters the collimating lens 120 via the triangular prism 130.

The optical fiber 110 is a single mode fiber as described above. Therefore, the diameter of the core is approximately within a range of 3 μm through 9 82 m, depending on the wavelength of the beam passing therethrough. The end surface 110a of the optical fiber 110 is located at a position conjugate with the target side focal point of the objective lens 140. Thus, only the part of light incident on the collimating lens 120 and converged on the target 10 is converged on the end surface 110a of the optical fiber 110. Therefore, the end surface 110a functions as a pinhole, and the optical system inside the confocal probe 100 is a telecentric optical system, which well suppresses loss of light. The light converged on the end surface 100a is incident on the optical fiber 110, and transmitted, through the coupler 320, to the light receiving element 330.

The light reflected by the target 10 but not from the target side focal plane of the objective lens 140 is not converged on the end surface 110a, and thus does not enter the optical fiber 110. Therefore, such light will not be transmitted to the processor 300. That is, the end surface 110a and the target 10 are confocal.

Since the light introduced in the confocal probe 100 are directed as described above, the optical fiber 110 is arranged such that the optical path of the chief ray of the beam emitted from the optical fiber 110 and the optical axis $AX_{CL}$ of the collimating lens 120 are shifted by $\Delta g$, which is given by equation (7) below.

$$\Delta g = f_{CL} \cdot \tan[\theta_{in} + \theta_{out}(\lambda_0) - \theta_\alpha] \quad (7)$$

It should be noted that, if the confocal probe 100 is configured such that the optical elements therein are formed of different material, the coefficients of thermal expansion thereof may differ from each other. In such a case, thermal characteristics of the optical system may be deteriorated. If the thermal characteristics are deteriorated, positional relationship between the optical elements may be deteriorated, which causes unexpected displacement of the optical path. In such a case, a clear image of the target may not be obtained.

To cope with this problem, according to the embodiment, the collimating lens 120, the triangular prism 130 and the objective lens 140 are formed with the same optical material. By forming the optical elements arranged in the confocal probe 100 with the same optical material, a bad effect, as described above, of the temperature change around the confocal probe 100 can be avoided.

FIG. 5 shows a structure of a confocal probe 100M according to a modification of the embodiment. The confocal probe 100M is similar to the confocal probe 100 shown in FIG. 2 except that the triangular prism 130 is replaced with a wedge prism 131. The wedge prism 131 is arranged such that the beam emerged from the optical fiber 110 is incident on a light incident surface 131a of the wedge prism substantially perpendicularly (i.e., the incident angel $\theta_{in}=0°$). In this case, an angle $\theta_{out}(\lambda)$ of emergence of a beam (i.e., each dispersed beam) whose wavelength is $\lambda$ and which emerges from a light emerging surface 131b is given by equation (8).

$$\theta_{out}(\lambda) = \arcsin[n(\lambda)\sin\theta_w] \quad (8)$$

where, $\theta w$ represents an angle formed between the light incident surface 131a and the light emerging surface 131b (i.e., a wedge angle). As is understood from equation (8), the angle of emergence depends on the wavelength.

The present invention is not limited to the configurations which are described with reference to the exemplary embodiment and modification. For example, in the embodiment and modification described above, prisms (i.e., the triangular prism and the wedge prism) are used to disperse the incident light depending on the wavelengths. Any other optical element may be alternatively used.

The present disclosure relates to the subject matter contained in Japanese Patent Application No. 2003-046628, filed on Feb. 24, 2003, which is expressly incorporated herein by reference in its entirety.

What is claimed is:

1. A confocal probe, comprising:
   an optical fiber introducing light having wavelengths within a predetermined wavelength range in the confocal probe;
   a collimating lens that collimates light emerged from an end surface of the optical fiber;
   a single dispersing prism that receives the light collimated by the collimating lens and disperses the received light in a predetermined direction without any internal reflection, light emerged from the dispersing prism and having the same wavelength being kept collimated; and
   a light converging optical system that converges the light emerged from the dispersing prism on a target.

2. The confocal probe according to claim 1, wherein an optical axis of the collimating lens, an optical axis of the light converging optical system and an optical path of a chief ray of the light emerged from the end surface of the optical fiber are substantially parallel with each other, the optical path of the chief ray of the light emerged from the end surface of the optical fiber being shifted with the optical axis of the collimating lens by a predetermined amount.

3. A confocal probe, comprising:
   an optical fiber introducing light having wavelengths within a predetermined wavelength range in the confocal probe;
   a collimating lens that collimates light emerged from an end surface of the optical fiber;
   a dispersing prism that receives the light collimated by the collimating lens and disperses the received light in a predetermined direction, light emerged from the dispersing prism and having the same wavelength being kept collimated; and
   a light converging optical system that converges the light emerged from the dispersing prism on a target,
   wherein the collimating lens is arranged such that a distance from the collimating lens to the end surface of the optical fiber and a distance from the collimating lens to a light incident surface of the dispersing prism are substantially the same as a focal length of the collimating lens.

4. The confocal probe according to claim 2, wherein a shifting amount $\Delta g$ between the optical path of the chief ray of the light emerged from the optical fiber and the optical axis of the collimating lens is expressed by a following equation:

$$\Delta g = f_{CL} \cdot \tan[\theta_{in} + \theta_{out}(\lambda_0) - \theta_{60}],$$

where,
   $f_{CL}$ is a focal length of the collimating lens;
   $\theta_{in}$ is an incident angle of the light emerged from the collimating lens and incident on the dispersing prism;
   $\lambda o$ is a wavelength of a reference dispersed light passing on the optical axis of the converging optical system;
   $\theta_{out}(\lambda o)$ is an emerging angle of the reference dispersed light emerged from the dispersing prism; and
   $\theta_\alpha$ is a vertex angle of the dispersing prism.

5. A confocal probe, comprising:
   an optical fiber introducing light having wavelengths within a predetermined wavelength range in the confocal probe;
   a collimating lens that collimates light emerged from an end surface of the optical fiber;
   a dispersing prism that receives the light collimated by the collimating lens and disperses the received light in a predetermined direction, light emerged from the dispersing prism and having the same wavelength being kept collimated; and a light converging optical system that converges the light emerged from the dispersing prism on a target, wherein the light converging optical system is arranged such that a distance from the light converging optical system to a position where each dispersed beam is emerged from the dispersing prism is substantially the same as the focal length of the light converging optical system.

6. The confocal probe according to claim 1, wherein the dispersing prism comprises a triangular prism.

7. A confocal probe, comprising:

an optical fiber introducing light having wavelengths within a predetermined wavelength range in the confocal probe;

a collimating lens that collimates light emerged from an end surface of the optical fiber;

a dispersing prism that receives the light collimated by the collimating lens and disperses the received light in a predetermined direction, light emerged from the dispersing prism and having the same wavelength being kept collimated; and a light converging optical system that converges the light emerged from the dispersing prism on a target, wherein the dispersing prism comprises a wedge prism.

8. The confocal probe according to claim 1, further comprising a driving mechanism that drives the light converging optical system in a direction perpendicular to the optical axis of the converging optical system and the predetermined direction.

9. A confocal probe, comprising:

an optical fiber introducing light having wavelengths within a predetermined wavelength range in the confocal probe;

a collimating lens that collimates light emerged from an end surface of the optical fiber;

a dispersing prism that receives the light collimated by the collimating lens and disperses the received light in a predetermined direction, light emerged from the dispersing prism and having the same wavelength being kept collimated;

a light converging optical system that converges the light emerged from the dispersing prism on a target; and a pinhole that shields light reflected by the target at a position other than the target side focal plane of the converging optical system, wherein the pinhole is the end surface of the optical fiber on which the light reflected by the target is incident.

10. A confocal probe, comprising:

an optical fiber introducing light having wavelengths within a predetermined wavelength range in the confocal probe;

a collimating lens that collimates light emerged from an end surface of the optical fiber;

a dispersing optical system that receives the light collimated by the collimating lens and disperses the received light in a predetermined direction, light emerged from the dispersing optical system and having the same wavelength being kept collimated; and a light converging optical system that converges the light emerged from the dispersing optical system on a target, wherein an optical axis of the collimating lens, an optical axis of the light converging optical system and an optical path of a chief ray of the light emerged from the end surface of the optical fiber are substantially parallel with each other, the optical path of the chief ray of the light emerged from the end surface of the optical fiber being shifted with respect to the optical axis of the collimating lens by a predetermined amount.

11. A confocal microscope, comprising:

a multi-spectrum light source that emits light having wavelengths within a predetermined wavelength range;

a confocal probe which includes an optical fiber that introduces the light emitted by the multi-spectrum light source in the confocal probe, a collimating lens that collimates light transmitted by and emerged from an end surface of the optical fiber, a single dispersing prism that receives the light collimated by the collimating lens and disperses the received light in a predetermined direction without any internal reflection, light emerged from the dispersing prism and having the same wavelength being kept collimated, and a light converging optical system that converges the light emerged from the dispersing prism on a target;

a measuring device that detects spectrum of the light reflected by the target; and an image generating system that generates an image of the target based on an output of the measuring device.

* * * * *